US012608483B2

(12) United States Patent
Grover et al.

(10) Patent No.: US 12,608,483 B2
(45) Date of Patent: Apr. 21, 2026

(54) COMPREHENSIVE SOFTWARE SUPPLY CHAIN ANALYSIS

(71) Applicant: MICRO FOCUS LLC, Santa Clara, CA (US)

(72) Inventors: Douglas Max Grover, Rigby, ID (US); Michael F. Angelo, Houston, TX (US); Baha Masoud, Santa Clara, CA (US); Alexander Hoole, Vancouver (CA); Carl Emil Orm Wareus, Malmo (SE)

(73) Assignee: Micro Focus LLC, Santa Clara, CA (US)

( * ) Notice: Subject to any disclaimer, the term of this patent is extended or adjusted under 35 U.S.C. 154(b) by 448 days.

(21) Appl. No.: 18/064,717

(22) Filed: Dec. 12, 2022

(65) Prior Publication Data

US 2024/0193276 A1 Jun. 13, 2024

(51) Int. Cl.
| | |
|---|---|
| *G06F 21/57* | (2013.01) |
| *G06F 8/71* | (2018.01) |
| *G06F 9/54* | (2006.01) |

(52) U.S. Cl.
CPC .............. *G06F 21/577* (2013.01); *G06F 8/71* (2013.01); *G06F 9/54* (2013.01); *G06F 2221/033* (2013.01)

(58) Field of Classification Search
CPC . G06F 21/577; G06F 8/71; G06F 9/54; G06F 2221/033; G06F 8/77
See application file for complete search history.

(56) References Cited

U.S. PATENT DOCUMENTS

| | | | | |
|---|---|---|---|---|
| 10,042,626 | B2 * | 8/2018 | Nekrestyanov | H04L 67/34 |
| 10,528,741 | B1 * | 1/2020 | Collins | G06F 21/577 |

(Continued)

FOREIGN PATENT DOCUMENTS

| | | |
|---|---|---|
| CN | 102253992 B | 1/2013 |
| CN | 111125712 A | 5/2020 |

(Continued)

OTHER PUBLICATIONS

Russell, Rebecca, et al. "Automated vulnerability detection in source code using deep representation learning." 2018 17th IEEE international conference on machine learning and applications (ICMLA). IEEE, 2018. (Year: 2018).*

(Continued)

*Primary Examiner* — Jung W Kim
*Assistant Examiner* — Sameera Wickramasuriya
(74) *Attorney, Agent, or Firm* — Sheridan Ross P.C.

(57) ABSTRACT

A current a version of an external component (e.g., an open-source component or a third-party component) that is used in a software application is identified. A new version of the current version of the external component is identified (supply chain components). For example, the new version may have been just released by an open-source community. In response to identifying the new version of the current version of the of the external component, a series of actions are implemented that include: identifying changes to Application Programming Interfaces (APIs) in the new version of the current version of the external component; identifying new vulnerabilities in the new version of the current version of the external component; and determining a quality history associated with the new version of the current version of the external component. Based on the actions, a composite score is generated and displayed to a developer.

21 Claims, 9 Drawing Sheets

(56) References Cited

U.S. PATENT DOCUMENTS

| | | | | |
|---|---|---|---|---|
| 10,614,223 | B2 * | 4/2020 | Abramovsky | G06F 21/577 |
| 10,740,164 | B1 * | 8/2020 | Roy | G06F 9/547 |
| 10,740,469 | B2 | 8/2020 | Zheng | |
| 10,846,394 | B2 * | 11/2020 | Ogura | G06F 21/51 |
| 11,308,218 | B2 | 4/2022 | Nagaraja | |
| 11,662,997 | B2 * | 5/2023 | Farrier | G06F 8/71 |
| | | | | 717/101 |
| 2003/0028803 | A1 * | 2/2003 | Bunker, V | H04L 43/00 |
| | | | | 709/224 |
| 2013/0179215 | A1 * | 7/2013 | Foster | G06Q 10/00 |
| | | | | 705/7.28 |
| 2014/0053135 | A1 * | 2/2014 | Bird | G06F 8/71 |
| | | | | 717/124 |
| 2014/0259173 | A1 * | 9/2014 | Parcel | H04L 63/1433 |
| | | | | 726/25 |
| 2016/0112451 | A1 * | 4/2016 | Jevans | G06F 21/56 |
| | | | | 726/25 |
| 2018/0173502 | A1 * | 6/2018 | Biskup | G06F 21/56 |
| 2021/0042207 | A1 * | 2/2021 | Joyce | G06F 11/3612 |
| 2021/0263728 | A1 * | 8/2021 | Farrier | G06F 17/18 |
| 2022/0405397 | A1 * | 12/2022 | Golan | G06F 21/57 |

FOREIGN PATENT DOCUMENTS

| | | | |
|---|---|---|---|
| CN | 111625839 | A | 9/2020 |
| CN | 111931183 | A | 11/2020 |
| CN | 113065137 | A | 7/2021 |
| CN | 113778509 | A | 12/2021 |
| KR | 20220071735 | A | 5/2022 |

OTHER PUBLICATIONS

Pham, Nam H., et al. "Detection of recurring software vulnerabilities." Proceedings of the 25th IEEE/ACM international conference on automated software engineering. 2010. (Year: 2010).*
GrammaTech Inc.; Gramma Tech News; GrammaTech Releases CodeSurfer® 1.6 for C; https://news.grammatech.com/grammatech-releases-codesurfer-1-6-for-c; Jan. 22, 2002.
P. Anderson, et al; The CodeSurfer software understanding platform; https://ieeexplore.ieee.org/document/1421024; 2022 IEEE.
SONATYPE; Open Source Security & Dependency Management; Nexus Lifecycle; https://www.sonatype.com/products/open-source-security-dependency-management; Nov. 30, 2022.

* cited by examiner

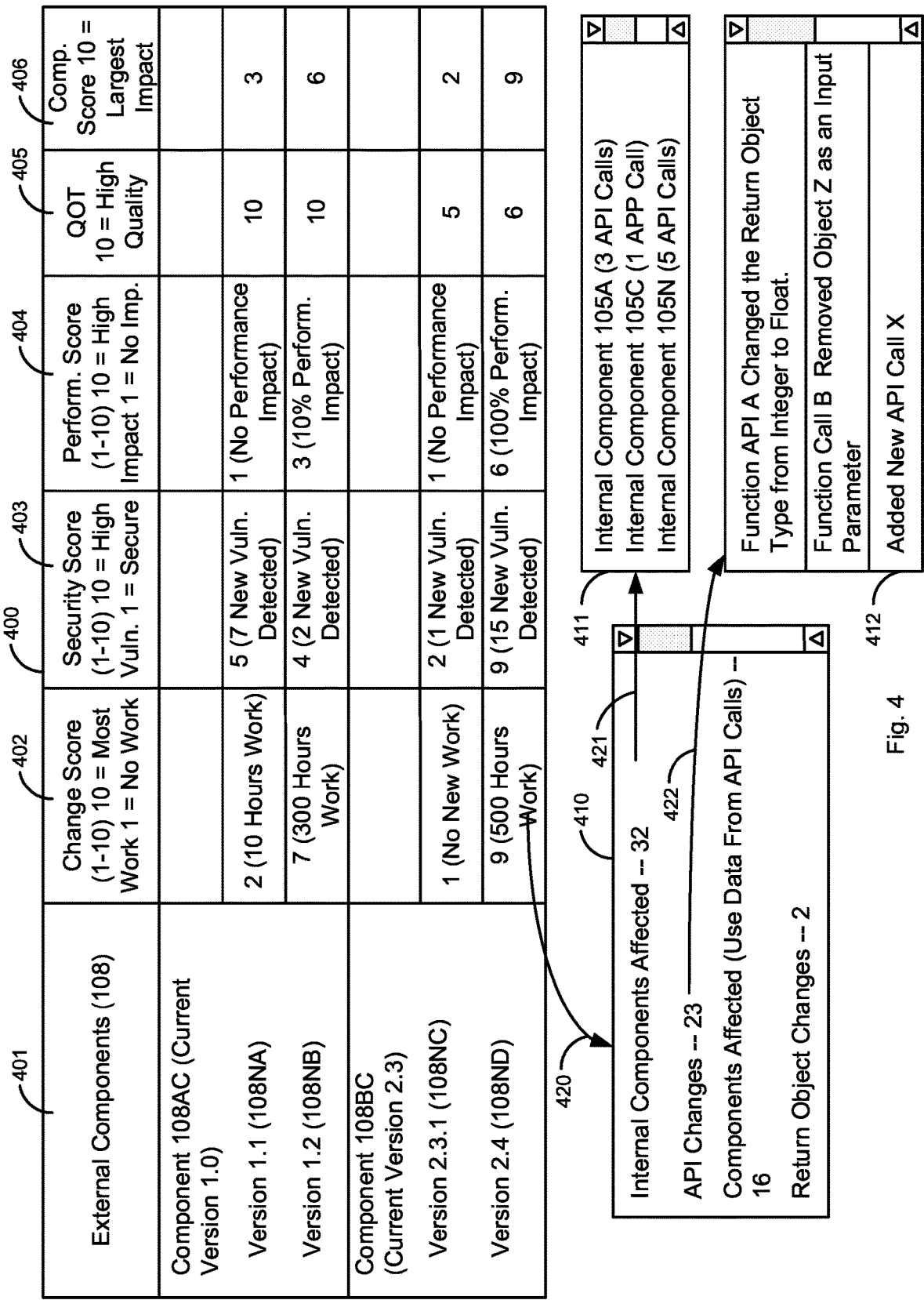

| External Components (108) | Change Score (1-10) 10 = Most Work 1 = No Work | Security Score (1-10) 10 = High Vuln. 1 = Secure | Perform. Score (1-10) 10 = High Impact 1 = No Imp. | QOT 10 = High Quality | Comp. Score 10 = Largest Impact |
|---|---|---|---|---|---|
| Component 108AC (Current Version 1.0) | | | | | |
| Version 1.1 (108NA) | 2 (10 Hours Work) | 5 (7 New Vuln. Detected) | 1 (No Performance Impact) | 10 | 3 |
| Version 1.2 (108NB) | 7 (300 Hours Work) | 4 (2 New Vuln. Detected) | 3 (10% Perform. Impact) | 10 | 6 |
| Component 108BC (Current Version 2.3) | | | | | |
| Version 2.3.1 (108NC) | 1 (No New Work) | 2 (1 New Vuln. Detected) | 1 (No Performance Impact) | 5 | 2 |
| Version 2.4 (108ND) | 9 (500 Hours Work) | 9 (15 New Vuln. Detected) | 6 (100% Perform. Impact) | 6 | 9 |

401
402
400
403
404
405
406

Internal Components Affected -- 32

API Changes -- 23

Components Affected (Use Data From API Calls) -- 16

Return Object Changes -- 2

410
421
422
420

Internal Component 105A (3 API Calls)
Internal Component 105C (1 APP Call)
Internal Component 105N (5 API Calls)

411

Function API A Changed the Return Object Type from Integer to Float.

Function Call B Removed Object Z as an Input Parameter

Added New API Call X

| External Components 108A/108B | Composite Score For Each External Object 10 = Largest Impact | Add to Project or Keep Current? |
|---|---|---|
| External Component 108AC Current Version 1.0 | | ○ Yes |
| Version 1.1 (108NA) | 3 | ● Yes |
| Version 1.2 (108NB) | 6 | ○ Yes |
| External Component 108BC Current Version 2.3 | | ○ Yes |
| Version 2.3.1 (108NC) | 2 | ○ Yes |
| Version 2.4 (108ND) | 9 | ● Yes |
| Metric Composite Scores | Change Score | 510 Hours |
| | Security Score | 8 (22 new Vulnerabilities) |
| | Performance Score | 4 |
| | QOT Score | 8 |
| Total Composite Score (10 = Largest Impact) | | 7 |
| Confidence Score | | 90% |

Fig. 5

| Governance Policies | Applicable to Project? |
|---|---|
| Code Changes | ☑ |
| Vulnerabilities | ☑ |
| Cross Component Vulnerabilities | ☐ |
| Performance Changes | ☑ |
| Quality History | ☐ |
| OSS Licenses | ☑ |

COMPREHENSIVE SOFTWARE SUPPLY CHAIN ANALYSIS

FIELD

The disclosure relates generally to software supply chain analysis for software components and particularly to managing various aspects of the software supply chain for software components.

BACKGROUND

Analysis of software supply chain issues is an extremely complex problem. For example, if there are multiple new versions of an open-source component, just switching to the latest version may not always be the optimal choice. There are many factors that should go into selecting which version of an open-source, or proprietary third-party, component makes the most sense for a particular software application.

SUMMARY

These and other needs are addressed by the various embodiments and configurations of the present disclosure. The present disclosure can provide a number of advantages depending on the particular configuration. These and other advantages will be apparent from the disclosure contained herein.

A current version of an external component (e.g., an open-source component or a third-party component) that is used in a software application is identified. A new version of the current version of the external component is identified (supply chain components). For example, the new version may have been just released by an open-source community. In response to identifying the new version of the current version of the external component, a series of actions are implemented that include: identifying changes to Application Programming Interfaces (APIs) in the new version of the current version of the external component; identifying new vulnerabilities in the new version of the current version of the external component; identifying resolved vulnerabilities in the new version of the current version of the external component; and determining a quality history associated with the new version of the current version of the external component. Based on the actions, a composite score is generated and displayed to a developer.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 4 is a diagram of an exemplary graphical user interface for displaying composite scores for external components.

FIG. 5 is a diagram of an exemplary graphical user interface for dynamically displaying composite scores based on a developer selection of new versions of individual external components.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1A:
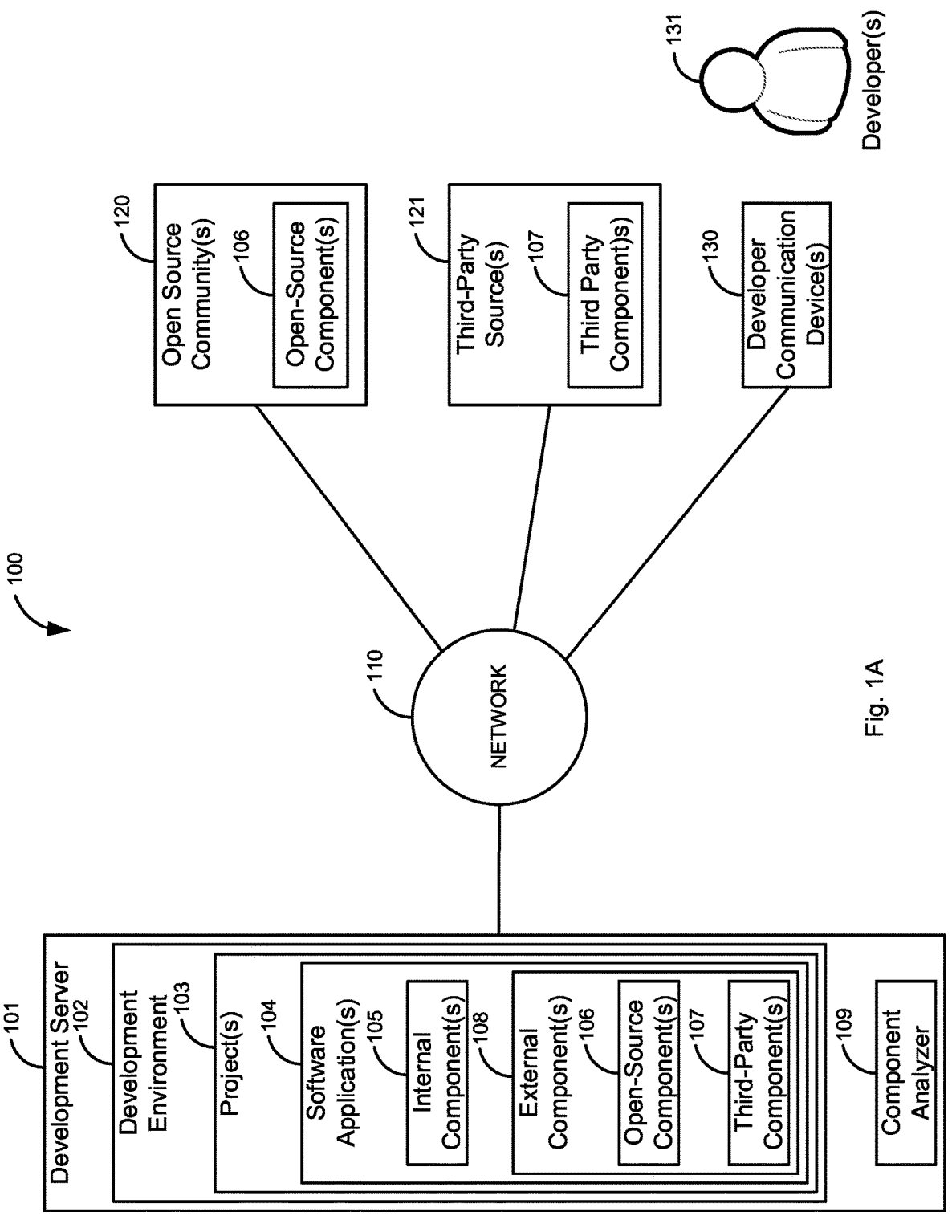
FIG. 1A is a block diagram of a first illustrative system for comprehensive supply chain analysis.

FIG. 1A is a block diagram of a first illustrative system 100 for comprehensive supply chain analysis. The first illustrative system 100 comprises a development server 101, a network 110, open-source community(s) 120, third party source(s) 121, and developer communication device(s) 130.

The development server 101 can be any type of device that can be used to provide a development environment 102 for the developers 131, such as, an application server, a code development server, and/or the like. The development server 101 further comprises the development environment 102 and a component manger 109. The development environment 102 may consist of any type/combination of software that can be used to develop software application(s) 104, such as Apache Ant, OutSystems™, Track Via™, Anypoint Platform™, SonarQube™, Iconic™, and/or the like. The development environment 102 further comprises project(s) 103. Although not shown in FIG. 1A, the development environment 102 may reside on a developer communication device 130, in a component artifact server, in a source code repository, and/or the like.

The project(s) 103 are used to develop individual software application(s), components, application programming interfaces (APIs), libraries, and/or the like 104. The project(s) 103 are distinct environments for each software application 104 (including different versions of the same software application 104). The project(s) 103 further comprise the software application(s) 104.

The software application(s) 104 may be any type of software application 104, such as, a security application, a web application, a mobile device application, an embedded application, a database application, a communications application, a data processing application, a financial application, a social network application, a word processing application, a downloadable application, and/or the like. The software application(s) 104 may be developed using various types of programming languages, such as, Java, C, C++, C #, JavaScript, Python, Visual Basic, Structured Query Language (SQL), assembly, and/or the like. A software application 104 may comprise a firmware application and/or a firmware/software application 104.

The software application(s) 104 further comprise internal component(s) 105 and external component(s) 108. The internal component(s) 105 may be any internally developed component, such as, a proprietary component, a custom software component, and/or the like.

The external component(s) 108 comprise open-source component(s) 106 and third-party component(s) 107. The open-source components(s) 106 are any components that are governed by an open-source license. The open source component(s) 106 may use any type of open source license(s), such as, Public Domain, Apache License, General Public License (GPL), Lesser General Public License (LGPL), Berkley Software Distribution (BSD) License, Massachusetts Institute of Technology (MIT) License, Mozilla Public License (MPL), Boost Software License (Boost), Eclipse Public License (EPL), and/or the like.

The third-party component(s) 107 can be any software that is licensed from a third party (e.g., a company other than the company developing the software application(s) 104). The third-party component(s) 107 are not licensed under an open-source license. For example, the third-party component(s) 107 may be licensed based on a contract from a different corporation that is part of a Software Development Kit (SDK) or is part of a royalty agreement.

The component analyzer 109 is used to manage the components (105-107) within the development environment 102/project(s) 103. For example, the component analyzer 109 may filter/control which external components 108 a developer 131 may bring into a project 103 for developing the software application 104. In addition, the component analyzer 109 gathers different metrics associated with the components 105-107 from various sources, such as, the open-source community(s) 120, the third-party communities 121, external databases (e.g., those that identify known malware/viruses), and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Transmission Communication Protocol (TCP), Hyper Text Transfer Protocol (HTTP), Web Real-Time Protocol (Web RTC), and/or the like. Thus, the network 110 is an electronic communication network configured to carry messages via packets and/or circuit switched communications.

The open-source community(s) 120 can be any open-source community 120 that hosts the open-source components 106, such as Maven™, GitHub™, the Linux Foundation™, Open the Source Initiative®, GNOME™, Red Hat®, the Free Software Conservancy™, the Mozilla Foundation™, and/or the like. The open-source community(s) 120 allow the developers 131 to download the open-source component(s) 106 into the development environment 102/project(s) 103.

The third-party source(s) 121 can be any source where a developer 131 can download the third-party components 107 into the development environment 102/project(s) 103. The third-party source(s) 121 may be hosted by a corporation that provides the third-party component(s) 107 over the network 110. For example, a corporation may provide the third-party component(s) 107 as part of a licensing agreement. The third-party sources may be directly provided by the third-party or indirectly provided from another source. The third party-component(s) 107 may be any type of software components, such as a binary, a .DLL, a class, a jar, and/or the like.

The developer communication device 130 can be or may include any user device that can communicate on the network 110, such as a Personal Computer (PC), a tablet device, a laptop device, a notebook device, a smartphone, and/or the like. As shown in FIG. 1A, any number of developer communication device(s) 130 may be connected to the network 110, including only a single developer communication device 130. In addition, the developer communication device 130 may be directly connected to the development server 101. The developer communication device 130 may be the development server 101.

The developer 131 may be any user who works on development of the software application 104, such as, a software developer, a software engineer, a project manager, a team manager, a product manager, an executive, and/or any interested party.

Figure 1B:
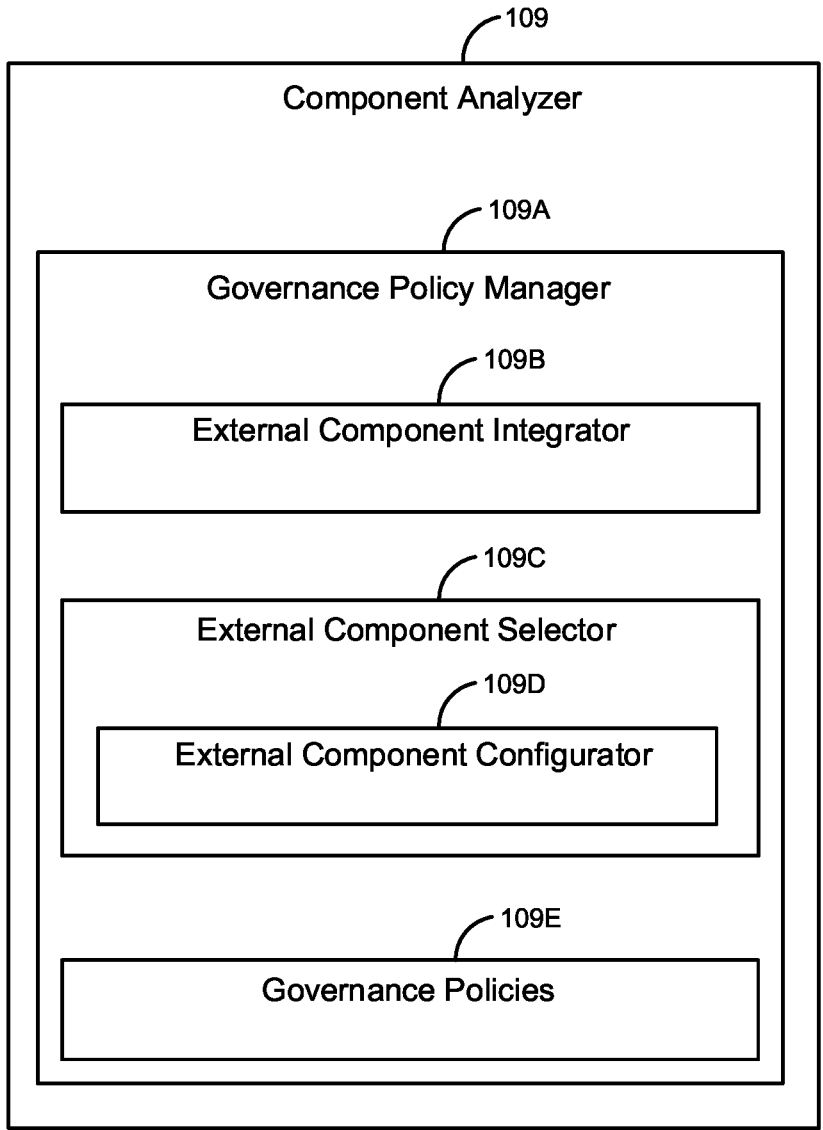
FIG. 1B is a block diagram of functions provided by a component analyzer.

FIG. 1B is a block diagram of functions provided by the component analyzer 109. The component analyzer 109 comprises a governance policy manager 109A, an external component integrator 109B, an external component selector 109C, an external component configurator 109D, and governance policies 109E.

The governance policy manager 109A is used to implement the governance policies 109E. The governance policy manager 109A can be used to define/enforce the governance policies 109E at a developer 131 level, at a development environment 102 level, and/or at a project 103 level. The governance policy manager 109A can implement/enforce various types of governance policies, such as, open-source license policies, security policies, code change policies, cross component vulnerability policies, quality history policies, and/or the like.

The external component integrator 109B is used to integrate the external components into the development environment 102/project(s) 103. For example, based on a selection by the developer 131, the external component integrator 109B may integrate one or more new external components 108 into the development environment 102/project(s) 103.

The external component selector 103C allows the developer 131 to select external components 108 to be previewed before the external components 108 are integrated into the development environment 102/project(s) 103. For example, as the developer 131 may want to preview an open-source component 106 to determine how much work it will take to integrate that particular version of the open-source component 106 into the development environment 102/project(s)

103. The external component configurator 109D configures the external components into the development environment 102/project(s) 103.

Figure 2:
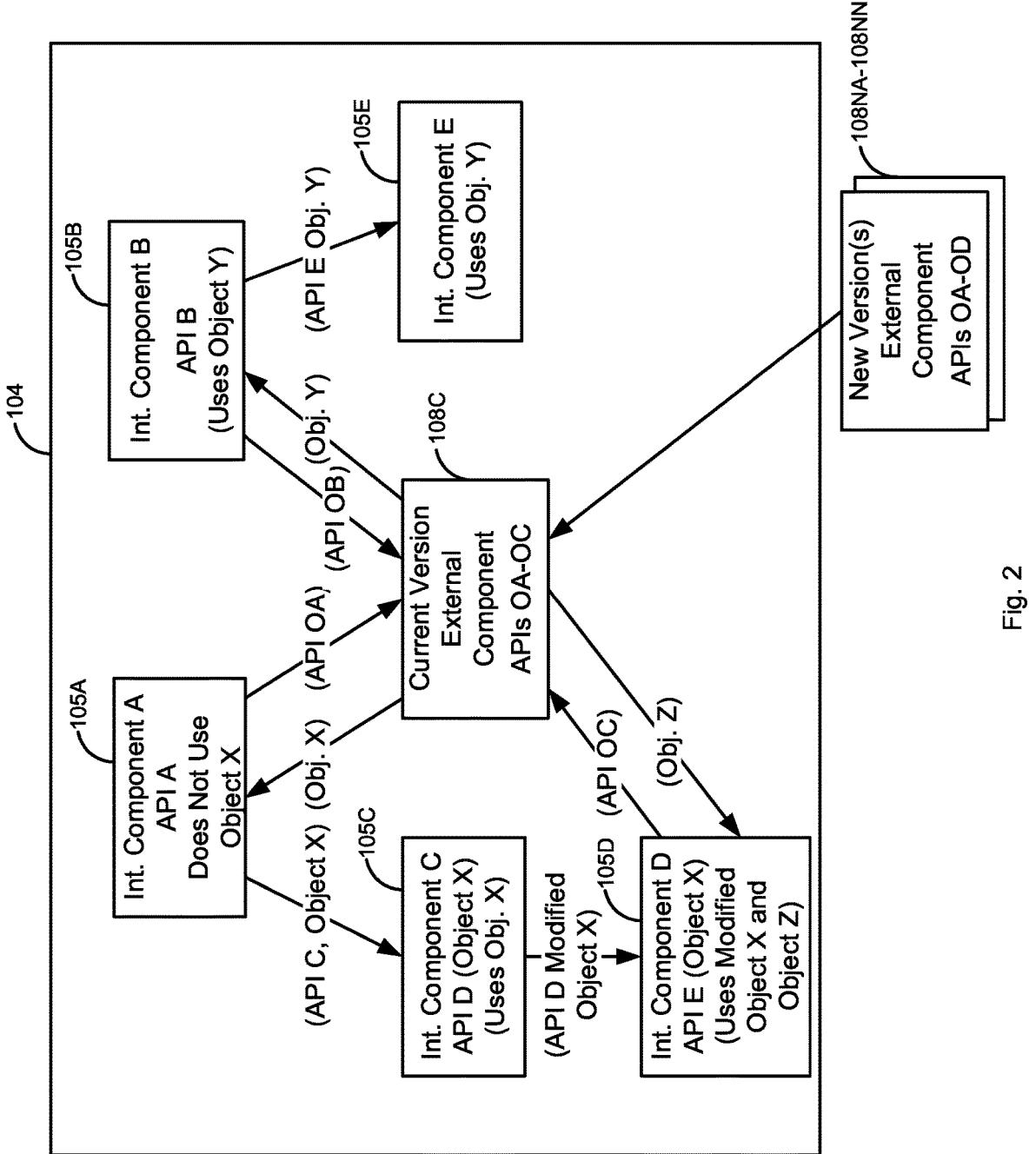
FIG. 2 is a block diagram of a software application that uses Application Programming Interface (API) calls using an external component.

FIG. 2 is a block diagram of a software application 104 that uses Application Programming Interface (API) calls using an external component 108 (e.g., an open-source component 106 or third-party component 107). In this example, the software application 104 comprises internal components 105A-105E and a current version of the external component 108C. In addition, new version(s) of the external component 108NA-108NN are used to determine an estimate of how much work/time it will take to integrate any one of the new versions of the external component 108NA-108NN into the software application 104. Any new version of the external component 108 may be generally referred to as 108N. At this point, the new versions of the external component 108NA-108NN have not been integrated into the software application 104. For example, the new versions of the external component 108NA-108NN may reside in one of the open-source community(s) 120 (e.g., GitHub) or have been pulled down to the development environment 102/project 103, but not integrated.

As discussed in this document, an API call is a call that is made between the components 105-107. A function call is defined as a call within the individual components 105-107. An object is a software object/parameter, such as, a string, an array, an integer, a float, a window object, a stream object, a button object, and/or the like. A method is an API/function call that uses the objects in various ways.

A composite score is a score that is generated based on various metrics that have an impact on development of the software application 104. A composite score may be for an individual external component 108 (e.g., an open-source component 106 and/or a third-party component 107), for one or more internal components 105, an overall composite score for the software application 104, and/or the like.

The component analyzer 109 scans the code (typically source code, but also may be a binary) of the internal components 105A-105E of the software application 104 to determine if the internal components 105A-105E make any API calls to the current version of the external component 108C. In one embodiment, a Graph Neural Network may be used to identify the flows of the API calls using a Document Object Model (DOM).

In FIG. 2, the internal component 105A makes the API call OA to the current version of the external component 108C. The current version of the external component 108C returns the object X to the internal component 105A. The internal component 105B makes the API call OB to the current version of the external component 108C. The current version of the external component 108C returns the object Y to the internal component 105B. The internal component 105D makes the API call OC to the current version of the external component 108C. The current version of the external component 108C returns the object Z to the internal component 105D.

The component manager 109 determines if the used APIs OA-OC have changed in any of the new version(s) of the external component 108NA-108NN. For example, an API may have been modified (have new input objects, different input objects, different return objects, different input methods, new return objects, etc.), have been removed, have been added to (e.g., the new versions of the external component 108NA-108NN now have API OD), and/or have been overloaded (addition of a new method with the same name that takes/returns different parameters).

If an object that is returned from one of the APIs A-C (e.g., objects X, Y, and Z), the component analyzer 109 follows the use of the objects X, Y, and Z in the internal components 105A-105N. For example, the internal component 105A just passes the object X to the internal component 105C by using API C. Internal component 105C modifies object X and passes the modified object X via API D to the internal component 105D. The internal component 105D then uses the modified object X internally. Each of these uses/modifications are considered when generating a composite score of how much work/time it will take to modify the internal components 105A, 105C, and 105D if the API OA is changed/removed. Specific types of changes can also be considered when determining a composite score. The analysis may be done using different types of analysis, such as, static analysis that analyzes the source code or dynamic analysis where the actual flow is captured at run-time.

The internal component 105B makes the API call OB and gets object Y. The internal component 105B uses the object Y and also passes the object Y to the internal component 105E via API E. Internal component 105E also uses object Y. The internal component 105D makes the API call OC and receives object Z. The internal component 105D uses the object Z. Each of the above uses of the objects X-Z are considered when generating a composite score for each new version of the external component 108N-108NN.

The component analyzer 109 can receive input that indicates if the developer 131/process is going to implement any new APIs in the new versions of the external component 108NA-10NN. For example, the new versions of the external component 108NA-108NN now have new API OD. If API OD is now going to be used by any of the internal components 105A-105D, this input can be considered when calculating a composite score. For example, the process may be automated where the component manager 109 can identify potential new uses of the APIs. The component analyzer 109 may determine previous usage of the new API OD from a database/open-source community 120 based on how other developers 131 are using the new API OD when migrating to a new version of an open-source component 106 to calculate a time estimate when migrating to the new version of the external component 108N. For example, if the new API makes modifications to the same instance of objects that used by API references, this may imply that the API is needed before, or after, existing calls. Alternatively, a Machine Learning (ML/Artificial Intelligence (AI) module can analyze open-source projects that use new external components 108N to build profiles of how components/libraries are most commonly consumed to provide insight on how developers 131 should use components.

In addition, the developer 131 may specify which internal components 105A-105E will use the new API OD and how the internal components 105A-105E will actually use the new API OD and any objects that are associated with the new API OD. The more internal components 105 that use the new API OD, the more work/time it will take to move to the new versions of the external component 108NA-108NN.

Alternatively, or in addition, the developer 131 may enter a time estimate for the new API. If an API no longer exists in the new versions of the external component 108NA-108NN, then any internal components 105 that uses the API/object(s) are identified and scoped as far as the impact on the internal components 105. For example, if API OC is no longer supported in the new external component 108NN, then the impact on internal component 105D will be factored into the composite score if the developer selects to use the external component 108NN.

Other metrics that may be used include unused APIs/objects and interfaces to other applications 104. The unused APIs/objects may be used to identify unnecessary code in the new external component 108NA-108NN that may need to be removed (a cost/time). Interfaces to other software applications 104 may cause a change in the code of the other software application 104. If an interface to another software application 104 is affected by moving to one of the new versions of the external component 108NA-108NN, this can be considered when generating the composite score.

Each of the new versions of the external component 108NA-108NN are individually analyzed to generate individual composite scores. For example, if the new version of the external component 108NN has a new overloaded method (not previously in the current version of the external component 108C or the new version of the external component 108NA) and the new overloaded method is going to be used, this information is taken into account (either via an automated approach or manual approach) when generating the individual composite score for the new version of the external component 108NN. The different composite scores can then be used by the developer 131 to determine if the current version of the external component 108C or one of the new versions of the external component 108NA-108NN will be used in the next build of the software application 104.

Figure 3:
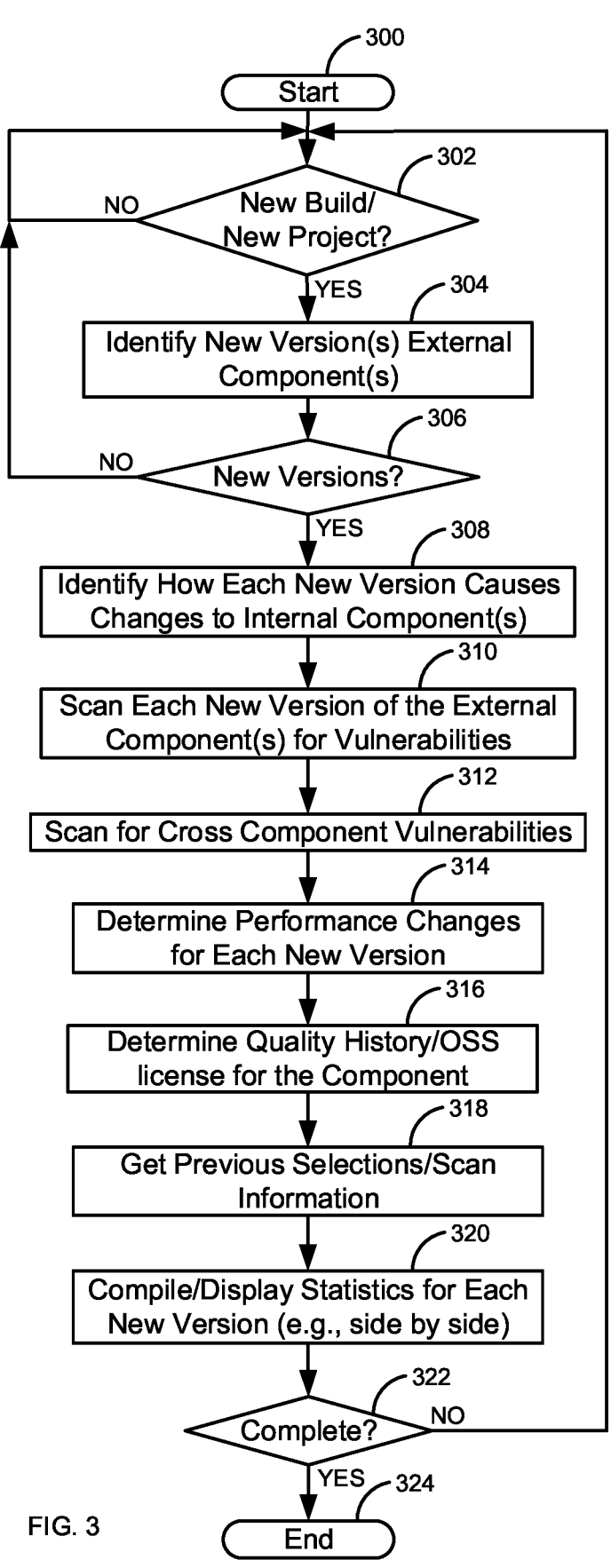
FIG. 3 is a flow diagram of a process for implementing a comprehensive supply chain analysis.

FIG. 3 is a flow diagram of a process for implementing a comprehensive supply chain analysis. Illustratively, the development server 101, the development environment 102, the project(s) 103, the software application(s) 104, the internal component(s) 105, the open source component(s) 106, the third party component(s) 107, the component analyzer 109, the open source community(s) 120, the third party sources 121, and the developer communication devices 130 are stored-program-controlled entities, such as a computer or microprocessor, which performs the method/creates graphical user interfaces of FIGS. 3-7 and the processes described herein by executing program instructions stored in a computer readable storage medium, such as a memory (i.e., a computer memory, a hard disk, and/or the like). Although the methods/graphical user interfaces described in FIGS. 3-7 are described in a specific order, one of skill in the art would recognize that the steps in FIGS. 3-7 may be implemented in different orders and/or be implemented in a multi-threaded environment. Moreover, various steps may be omitted or added based on implementation.

The identification of code changes can be incorporated into an overall analysis process as described in FIG. 3. The process starts in step 300. The component analyzer 109 (based on input from the development environment 102) determines, in step 302, if there is going to be a new build (e.g., moving to a next version of the software application 104)/new project 103 (a first time the software application 104 is being created). The process of step 302 may use other event(s), such as, where the developer 131 wants to see if there are any new versions of one or more new external component 108N. For example, a build script may be an event that triggers the search for new versions of the external components 108N.

If there is not a new build or new project 103, the process of step 302 repeats. Otherwise, if there is a new build/project 103 in step 302, the component analyzer 109 identifies new version(s) of external components 108N in step 304. For example, as described in FIG. 2, the new versions of the external component 108AN-108NN are identified by the component analyzer 109. If there are not any new versions in step 306, the process goes back to step 302.

Otherwise, if there are new versions of the external component(s) 108N in step 306, the component analyzer 109 identifies how each new version causes changes to the internal component(s) 105 in step 308. For example, identification of how each new version of the external component(s) 108N causes changes to the internal component(s) 105 may work similar to the process described above in FIG. 2. Other examples may include determining if there are no API changes, determining if new APIs that are added (determine a likely hood of need using an AI process), determining use of an overloaded API versus the current API, determining if removed APIs are not used, identifying APIs that are used, but are now deprecated, and/or the like. This can include entire sets of new functionality wherein new instances/class variables are added (may include a lot of additional work), identifying private/protected APIs for their impact, identifying a number of API changes, and/or the like.

In one embodiment, the scanning process may look at the delta between each version. In addition, the scanning process may identify the delta between the current version of the external component 108C in relation to each new version of the external component 108N. For example, the delta from version 1.0 to 1.1 may be a 25% code change and the delta from version 1.1 to version 1.2 may also be a 25% code change. Thus, the delta from version 1.0 to version 1.2 is a 50% code change (or an equivalent number of developer hours). The delta may be based on a delta of API changes versus code changes (or a combination of both).

The component analyzer 109 scans each new external component 108 for any vulnerabilities in step 310. This may include doing a static analysis (or even dynamic analysis) of the different versions of the new external component(s) 108N, getting vulnerability information from a database that identifies known vulnerabilities/threats (e.g., for doing a virus scan), and/or the like. The vulnerabilities may be ranked based on various heuristics such as severity and/or type. In addition, the developer 131 may be asked to identify any vulnerability types that may not apply to the current project 103 to filter out any irrelevant vulnerabilities. For example, the ability to break a particular type of encryption may not apply to a software application 104 that does not use encryption.

Other vulnerabilities may include identifying potential dependency confusion issues, such as identify typo squatting vulnerabilities. Typo squatting is where a nefarious party creates a new nefarious version of an external component 108 that has a slight variance in a path (e.g., a path that the project 103 uses to bring in an open-source component 106 from an open-source community 120). If the developer 131 makes a typo in the path, the nefarious version of the external component 108 may be brought into the project 103 unintentionally.

Other vulnerabilities may include various attack vectors. An attack vector is any mechanism used by an attacker to exploit cybersecurity vulnerabilities. An attack vector may be a flaw in how the external component 108 is coded (e.g., where a larger array size is copied to a smaller array size). The attack vector may also have an associated score of how likely the attack is to be implemented.

The component analyzer 109 scans for cross component vulnerabilities in step 312. A cross component vulnerability is where two or more new external components 108N are added, the combination causes a vulnerability. For example, if a first new external component 108N (an open-source library) combined with second new external component 108N (an open-source component that uses the library)

allows an attacker to bypass an administrator password, this would be considered a cross component vulnerability. In addition, a cross component vulnerability may be between two versions of the same external component 108. For example, if a new external component 108N (e.g., version 1.1) contains a portion of a security vulnerability and a second version of the external component 108N (e.g., version 1.11) contains the code to bring out the security vulnerability (where independently the security vulnerability is not identified), this can be identified in step 312. An example would be where one external component 108 has a deserialization vulnerability and other external component 108 have an unreachable flaws/vulnerability that is now reachable because of the deserialization vulnerability, an error may be flagged that is used to calculate a score.

The component analyzer 109 determines performance changes for each new version of the external components 108 in step 314. For example, the amount of code that is used for APIs OA-OC (those called by the internal components 105A, 105B, and 105D in FIG. 2) in the current version of the external component 108C may be compared the same API calls of the new versions of the external component 108NA-108NN to determine if any of the code has changed. For instance, the code for API OA may have increased by 250% in the new version of the external component 108NA compared to the code of the current version of the external component 108C. This may be done on the fly or can be precomputed up front (e.g., precomputed and stored in a database for open-source components 106).

A quality history for each external component(s) 108 is calculated in step 316. The quality history of the external component(s) 108 may include: a number of changes over time, quality-over-time, a number of bug fixes (e.g., increasing/decreasing) over time, performance changes over time, new vulnerabilities over time, existing vulnerabilities over time (i.e., how long it takes to fix vulnerabilities), and/or the like. The quality history may include a quality history of a particular external component 108, a quality history of an open-source community 120, a quality of a third-party source 121, a developer quality (e.g., a developer 131 who will add the new external component 108N), and/or the like. The quality history is an indicator of possible additional work/time that may be needed to migrate to a new version of the external component 108.

Other quality metrics that may be used can include scores related to the open-source component(s) 106, such as, size of the development community for the open-source component 106, longevity of the open source component 106, who contributed to the open source component 106 (a known quality contributor), what changes the contributor made to the open source component 106, and/or the like. In addition, other metrics may be used, such as, avoidance costs (how much will this cost later on if you do not fix it now) may be used to help in the decision process. For example, the cost to make changes may be medium, but the cost to not make changes could be extremely high (e.g., the potential for a malicious attack). This type of information can then be conveyed to the developer 131. Other metrics may include evaluating engineering resources (how experienced is a particular software engineer), identifying a quality of a code repository, identifying code flaws, and/or identifying changes to internal components.

Other quality metrics associated with an external component 108 may include thread usage, memory usage, execution speed, etc. For example, the open-source community(s) 120 may have some of these metrics (e.g., memory usage)

that are stored in the open-source community 120 for each version of the open-source component 106 (both current and new versions 106).

Step 316 may also consider, for open-source components/open-source software (OSS) 106, an open-source license associated with the new open-source component 106. For example, if the new open source component 106 has a GPLv3 license (a viral license that affects code linked to the open source component 106) and the current version of the open source license 106 has a MIT (a non-viral license), the GPLv3 license in the new open source component 106 may have a higher risk factor score than the MIT license used by the current version of the open source component 106. In one embodiment, the more restrictive GPL license may cause the new version of the open-source component 106 to be blocked or not be shown to the developer 131, thus preventing the developer 131 from adding the new version of the open-source component 106 to the project 103.

The component analyzer 109 may use user selections/previous scan information in step 318. For example, the developer 131 may select specific types of metrics (e.g., any of those discussed herein) for generating composite scores. The developer 131 may apply weights to specific metrics. In addition, previous scan information/history may be used. For example, if there were previous results for a specific new version of an external component 108, the component analyzer 109 may use the previous results instead of regenerating the new results.

While the processes described in steps 308-318 are described as being implemented in series, the process may work in other ways. For example, one of more of the steps 308-318 may be implemented in parallel (e.g., using different threads).

The component analyzer 109 compiles/stores/displays statistics for each new version of the external components 108N in step 320. In order to improve the external component 108 selection process, a total impact/composite score that each new version of an external component 108N will have on a project 103 is calculated and displayed to the developer 131. For example, if there are three new versions of an open-source component 106 available, the total impact for each of the three new open-source components 106 may be determined in relation to the current version of the open-source component 106. The component analyzer 109 may use any of the factors discussed herein to determine how adding new versions of an external component 108 will impact a software application 104.

The display of the statistics/scores in step 320 may be specific to a business process of a company/entity. For example, a project manager may define specific governance policies 109E for a particular organization. Thus, the statistics/score are tailored to the specific needs of the organization.

This allows the developer 131 to select specific new versions of the external components 108N. As each new version of the external component(s) 108N are selected and integrated into the project 103, a composite score for each new external component 108 may be displayed. For example, the composite score is dynamically calculated each time the developer 131 selects a new external component 108 and adds it to the project 103 for developing the software application 104 (e.g., as described in FIG. 5).

The component analyzer 109 determines, in step 322 if the process is complete. The determination if the process is complete may be determined in various ways. For example, a governance policy 190E defined through Governance Policy Manager 109A can specify the minimal values/ watermarks to achieve completeness. A default governance policy 109E may be provided; however, the default governance policy 109E may be overridden to represent specific governance policies 109E of a target organization owning the projects (103). The governance policy manager 109A is an extensible mechanism for defining minimal measures to achieve software supply chain security policy goals governance policies 109E. Specific governance policies 109E may include a software composition analysis (SCA) process, a SCA vulnerability analysis process, a SCA health analysis (e.g., as described in step 316), SCA license analysis process (e.g., as described in step 316), a performance analysis, virus/malware analysis process, and/or the like.

If the process is not complete in step 322, the process goes back to step 302. Otherwise, if the process is complete in step 322, the process ends in step 324. The end may be where the project is complete or based on some other governance policy 109E.

FIG. 4 is a diagram of an exemplary graphical user interface 400 for displaying high-level composite scores for external components 108. The graphical user interface 400 comprises a component column 401, a change score column 402, a security score column 403, a performance score column 404, Quality-Over-Time (QOT) column 405, and composite score column 406.

The component column 401 shows the external components 108, including both the current versions 108AC/108BC and the new versions 108NA/108NB/180NC/108ND. The change score column 402 shows an estimated amount of work that is required when switching to a new version of an external component 108 along with a change score. The security score column 403 shows a security score/number of identified vulnerabilities. The performance score column 404 shows the performance score/percentage of change. The QOT column 405 shows a quality score for the new external components 108N. The composite score column 406 show a composite score (based on the scores in columns 402-405).

The graphical user interface 400 is an example illustration for displaying the various metrics for new version(s) of external component(s) 108N. Although only specific metrics are shown, as one of skill in the art would recognize, any of the metrics/combination of the metrics discussed herein may be displayed to the developer 131 via the graphical user interface 400.

FIG. 4 shows the calculated differences between each of the available new versions of the external components 108N (shown in the component column 401) in relation to the current external components 108AC and 108BC in the project 103 for the software application 104. For version 1.1 of the external component 108NA, migration requires approximately ten hours of new work (an impact score of two), has seven new vulnerabilities (an impact score of five), has no performance changes (an impact score of one), and has a high QOT value (an impact score of ten) for a composite score of three (ten being the highest impact). For version 1.2 of the external component 108NB, there are approximately three hundred hours of new work (an impact score of seven), two new vulnerabilities detected (an impact score of four), a ten percent performance impact (an impact score of three), and a quality-over-time score of ten for a total composite score of six.

For external component 108NC (version 2.3.1), the APIs have not changed (an impact score of one), there is one new vulnerability detected (an impact score of two), there is no performance impact (an impact score of one), and a lower quality-over-time score (an impact score of five) for a total composite score of two (low impact). On the other hand, for version 2.4 of the external component 108ND, there are significant changes that requires approximately five hundred hours of new work (an impact score of nine), fifteen new vulnerabilities (an impact score of nine), a one hundred percent performance impact (an impact score of six), and a quality-over-time score of six for a total composite score of nine (high impact).

The developer 131 can drill down on specific metrics for any of the metrics in the columns 401-405. For example, by clicking on the change score for the external component 108ND (version 2.4) in step 420, the developer 131 can see details on what was used to calculate the change score as shown in change score window 410. The change score window 410 shows that there were thirty-two internal components 105 affected, twenty-three API changes, sixteen internal components 105 affected by using data from objects used in the APIs, and two return object changes. Although not shown, other metrics associated with the change score may be displayed to the user (e.g., by the user scrolling down in the change score window 410).

The developer 131 can then drill down further to look at additional details associated for any of the metrics. For example, by clicking on the internal components affected line in step 421, the internal components affected window 411 is displayed to the developer 131. The internal components affected window 411 has a list of internal components 105 that were affected (internal component 105A, 105C, and 105N) along with the number of API calls made. The user can then scroll through the list of internal components affected (e.g., using a scroll bar).

Likewise, the developer 131 can click on the API changes in step 422 to display the API changes window 412. The API changes window 412 displays details of each of the twenty-three changes. For example, the API changes window 412 shows that API A changed the return object type from integer to float, function call B no longer has object Z as an input parameter, and that a new API X was added to the version 2.4 of the new external component 108ND.

Furthermore, the developer 131 can click on any of the metrics for any of the configured modules to view further details related to potential violations of the configured governance policy 109E.

By viewing this data, the developer 131 can now make informed decisions on which new version(s) of the external components 108N make the most sense based on the needs those working on the new versions of the software application 104. For example, if there is a short development cycle, migrating to version 2.3.1 (108NC) from the external component 108BC may make more sense than migrating to version 2.4 (108ND) which requires significant code changes.

The diagram of FIG. 4 is only representative and could be displayed in various ways. For example, what is shown in the security score column 403 may include multiple types of security metrics when drilled down on (i.e., selected). This could include security metrics, such as, known vulnerabilities, previously known weakness, malware issues, and/or the like. In one embodiment, what is displayed at the higher levels may be configured by the developer 131 or another user.

FIG. 5 is a diagram of an exemplary graphical user interface 500 for dynamically displaying composite scores based on a developer's selection of new versions of individual external components 108N. The graphical user interface 500 uses the metrics described in FIG. 4 for the external components 108AC, 108NA, 108NB, 108BC, 108NC, and

108ND. The graphical user interface 500 comprises external component column 501, composite score column 502, selection column 503, a metric composite score row 504, a total composite score row 505, a confidence score row 506, and selection radio buttons 510A-510B.

The external component column 501 lists the current versions of the external components 108AC and 108BC. The external component column 501 also lists the corresponding new versions of the external components 108NA, 108NB, 108NC, and 108ND. The composite score column 502 shows the corresponding composite scores (the same as shown in FIG. 4) for each of the new versions of the external components 108NA (3), 108NB (6), 108NC (2), and 108ND (9).

The graphical user interface 500 is context aware. By using the selection radio buttons 510A-510B in the selection column 503, the developer 131 can determine the impact each of the individual new external components 108NA, 108NB, 108NC, and 108ND will have on the project 103/software application 104. For example, in FIG. 5, the developer 131 has selected the new versions of the external components 108NA/108ND using the radio buttons 510A/510B.

Based on the selection of the new versions of the external components 108NA/108ND using the selection radio buttons 510A-510N, the composite metric scores in the metric composite score row 504 are displayed to the developer 131. For example, as shown in FIG. 5, the change score is five hundred and ten hours (ten hours plus five hundred hours), the security score is eight (seven plus fifteen vulnerabilities=twenty two new vulnerabilities), the performance score is four (using the one for external component 108NA and six for the external component 108ND), and the QOT score is eight (ten from the external component 108NA and six from the external component 108ND).

Based on the selections by the developer 131, a total composite score of seven is displayed to the developer 131 in the composite score row 505. The total composite score is based on the metric composite scores. The total composite score may consider the total number of new external components 108N being added to the project 103. Thus, the total composite score would increase as the developer 131 selects additional new external components 108N to add to the project 103.

In addition, a confidence score related to the composite score may be generated and displayed to the developer 131. The confidence score may be based on an amount of information associated with the new external component 108N. For example, if some of the new vulnerabilities have limited information about the vulnerability or if there is limited amount of QOT information, the confidence score would be lower. In FIG. 5, the calculated confidence score is ninety percent.

If the developer 131 wants to see the metric composite scores, total composite score, and confidence score associated with a different set of new versions of the external components 108N, the developer 131 can select the other versions (e.g., version 1.2 108NB and/or version 2.3.1 108NC). When the developer 131 selects a different version using the radio buttons 510 (or even the current version), a new set of composite metric scores/total composite score/confidence score are displayed to the developer 131. Thus, the developer 131 can quickly see how new version 108NA-108NN can affect the overall software development process.

While the processes described in FIGS. 4-5 are discussed for new versions of the external components 108N, the process may also work for previous versions of the current version of the external component 108. For example, because of security issues associated with the current version of the external component 108C, the developer 131 may want to move back to a previous version of the current version of the external component 108. This allows the developer 131 to see the impact of moving back to a previous version of the current version of the external component 108C.

Figure 6:
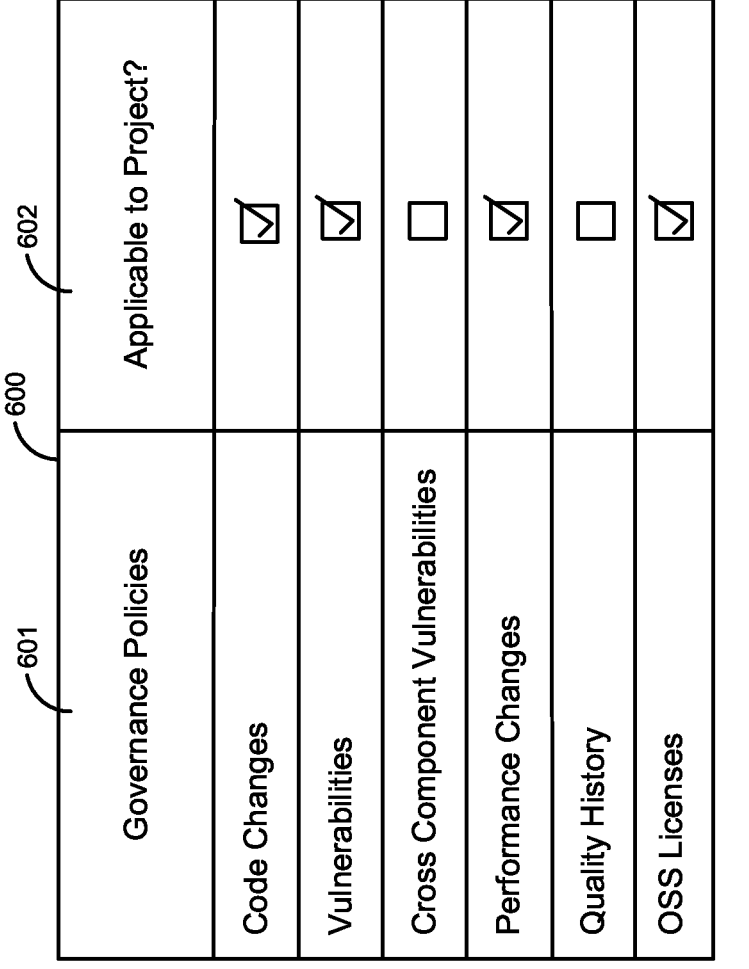
FIG. 6 is a diagram of an exemplary graphical user interface for defining governance policies.

FIG. 6 is a diagram of an exemplary graphical user interface 600 for defining governance policies 109E. The graphical user interface 600 for defining governance policies 109E comprises a governance policy column 601 and an applicable to project column 602. The governance policies 109E in the governance policy column 601 represent the governance policies 109E that were previously discussed in steps 308-316 of FIG. 3. Using the check boxes in the applicable to project column 602, the developer 131 can select what specific governance policies 109E are applicable to the project 103. For example, in FIG. 6, the developer 131 has selected that code changes, vulnerabilities, performance changes, and OSS licenses are applicable to the project 103. The governance policies 109E may be specific to an organization/entity, specific to a development environment 102, specific to a project, specific to a developer 131, and/or the like.

Figure 7:
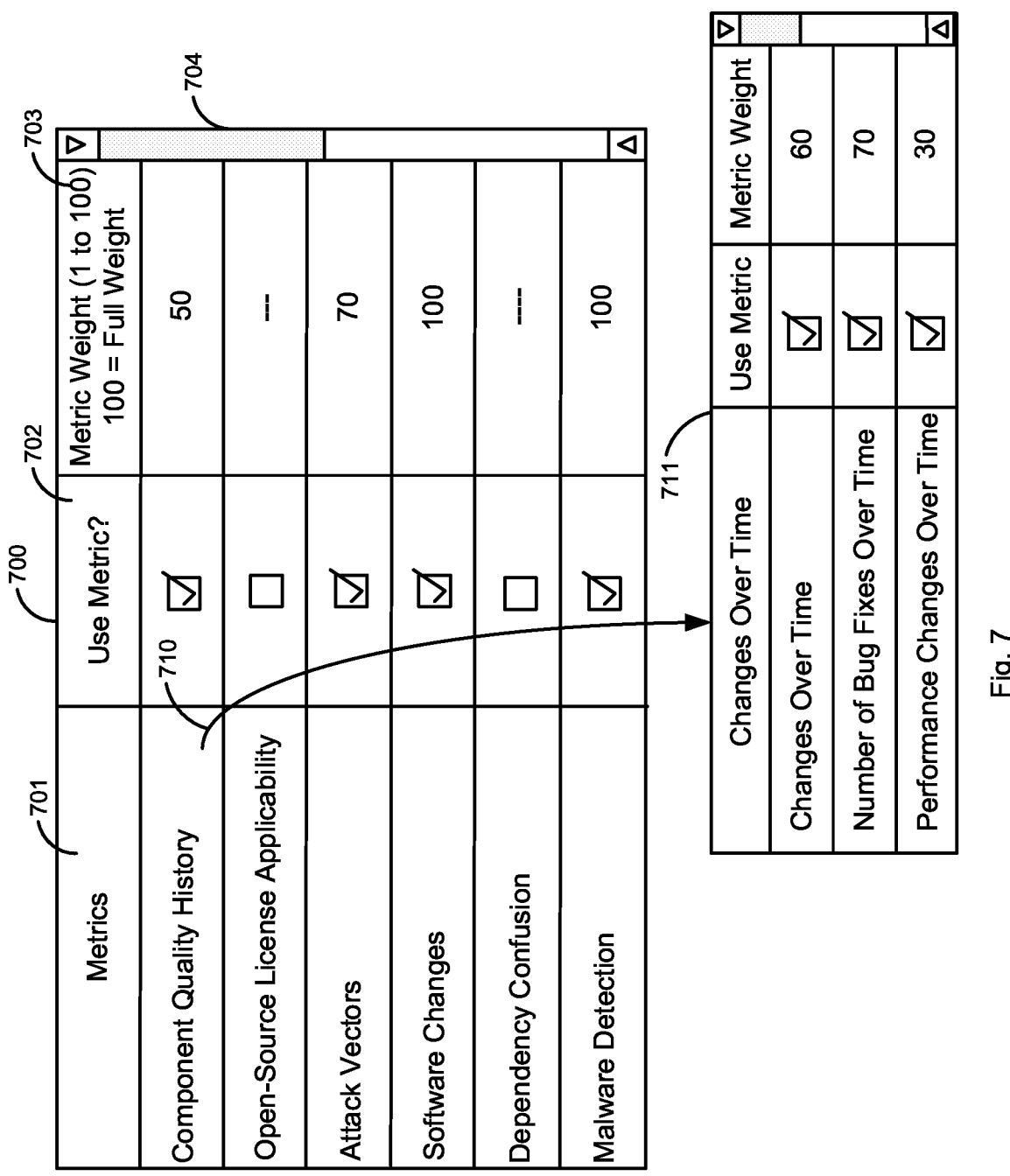
FIG. 7 is a diagram of an exemplary graphical user interface for selecting metrics/governance policies and applying weights to the selected metrics/governance policies.

FIG. 7 is a diagram of an exemplary graphical user interface 700 for selecting metrics/governance policies 109E and applying weights to the selected metrics/governance policies 109E. The metrics/governance policies 109E are shown at a lower level than those described in FIG. 6. Different metrics/governance policies 109E may be more important to the developer 131 when determining the various composite scores described in FIGS. 3-5. The graphical user interface 700 allows the developer 131 to identify which metrics/governance policies 109E are the most important. The graphical user interface 700 comprises a metrics column 701, a use metric column 702, and a metric weight column 703.

The metrics column 701 shows six different metrics: 1) component quality history, 2) open-source license applicability, 3) attack vectors, 4) software changes, 5) dependency confusion, and 6) malware detection. Although not shown, other metrics may be displayed to the developer 131 by using the scroll bar 704.

The developer 131 can select which individual metrics are applicable (by selecting the check box in the use metric column 702) and then enter a weight (in the metric weight column 703) to apply to the selected metric. For example, in FIG. 7, the developer 131 has selected the component quality history, the attack vectors, the software changes, and the malware detection as being applicable to the project 103/software application 104. The developer 131 has entered a weight of fifty for the component quality history, a weight of seventy for the attack vectors, a weight of one hundred for the software changes, and a weight of one hundred for the malware detection metrics. In FIG. 7, the weights apply to the metric by itself. However, in some embodiments, the weight total may equal 100%.

The developer 131 has also indicated that the open-source license applicability and dependency confusion are not to be considered when calculating the confidence scores. Thus, there is no associated weight for these metrics. Once entered, the selected metrics may be stored for the development environment/project 103.

As one of skill in the art would recognize, each of the different metrics may comprise multiple metrics. For example, the component quality history metric may comprise individual metrics, such as, a number of changes over time, a number of bug fixes over time, performance changes over time, new vulnerabilities over time, existing vulnerabilities over time, and/or the like. In FIG. 7, the developer 131 has selected the component quality history metric in step 710. This displays the component quality history metric window 711 that allows the developer 131 to select and apply weights to the lower-level metrics for the component quality history metric similar to the process described for the user interface 700. This process can apply to any of the metrics.

One of the key advantages of the graphical user interfaces 400, 500, and 700 is that they allow the developer 131 to quickly quantify/sort massive amounts of data associated with the metrics via user interfaces 400, 500, 600, and 700. This dramatically simplifies the developer's ability to identify and select the proper new versions of the external components 108N versus what currently exists in the prior art. In other words, the user interfaces 400, 500, 600, and 700 are much more efficient.

Figure 8:
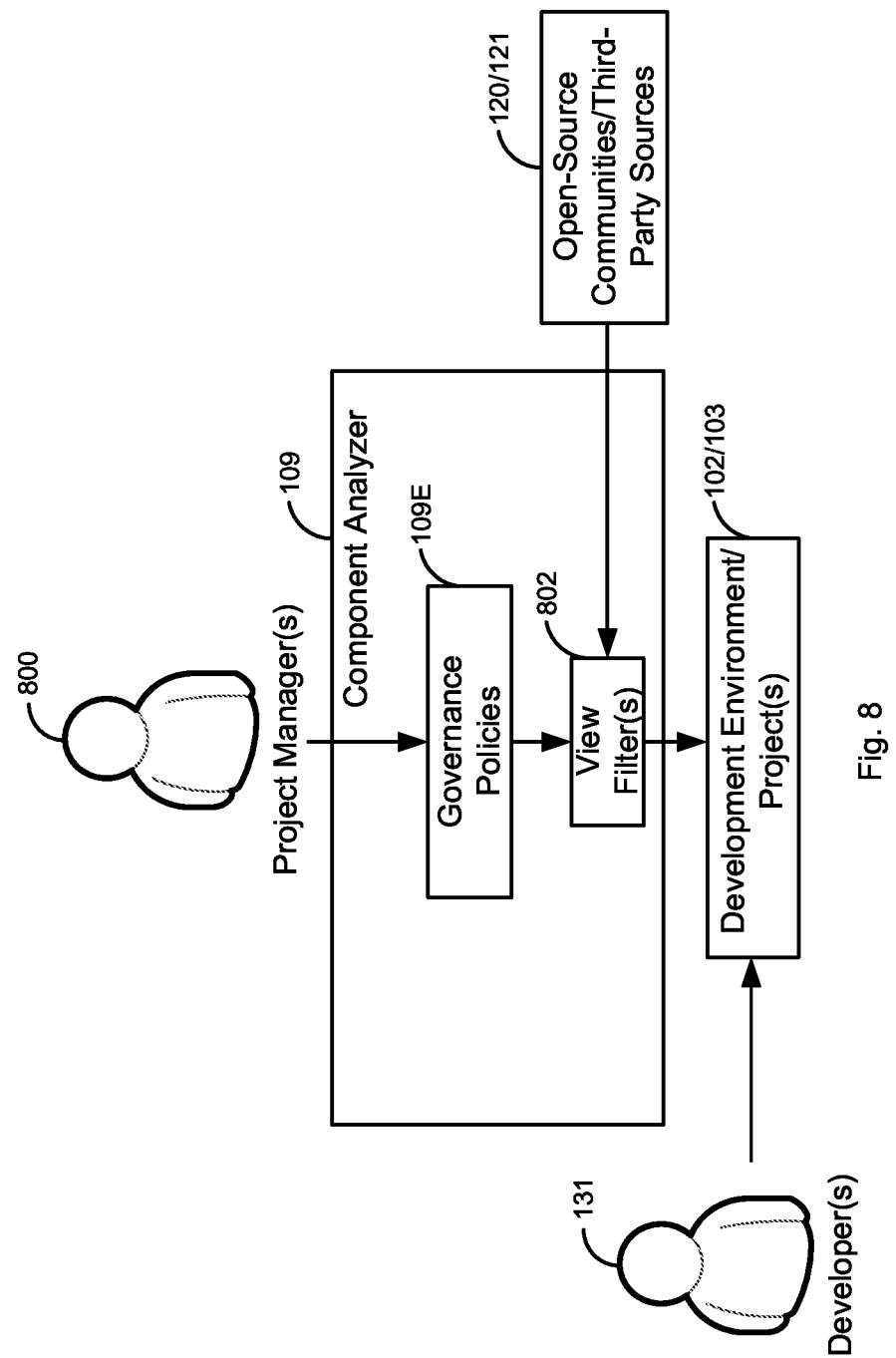
FIG. 8 is a diagram for how external components can be filtered in a development environment based on governance policies.

FIG. 8 is a diagram for how external components 108 can be filtered in a development environment 102/project(s) 103 based on governance policies 109E. In FIG. 8 the component analyzer 109 comprises governance policies 109E (for the external components 108 and/or the development environment 102 and/or project 103 and/or the open-source communities 120/third party sources 121), and view filter(s) 702. The governance policies 109E may be edited/modified by the project manager 800, the developer 131, other another party.

In addition, project manager(s) 800 are shown for convenience. The project manager(s) 800 may be any person who controls what information/new external components 108N may be used by the developer 131. The product managers 800 may access the development server 101 via a developer communication device 130.

What new versions of external components 108N a developer 131 can see/migrate into the development environment/project 103 to may be limited based on rules defined by the project manager(s) 800. The process may be used where the development environment 102 and/or project 103 automatically pulls in the latest new versions of an external component 108N for each build. When the component analyzer 109 identifies the latest new versions of the external components 108N (e.g., those in the open-source community(s) 120/third party source(s) 121), the component analyzer 109 may automatically do the change analysis/security analysis before any external components 108 are made available to the developer 131. The project manager(s) 800 define the governance policies 109E of what new external components 108N may be viewed by the developer 131. For example, the governance policies 109E may cause the view filter 802 to filter out any open-source components 106 that use the GPL open-source license and/or any external components 108 that require more than one hundred hours of new development time. The view filter(s) may be based on any of the metrics discussed herein. The view filter(s) 802 may be at the development environment 102 level and/or the project 103 level. Based on the view filter(s) 802, the developer 131 in the development environment 102/project(s) 103 can only view the new external components 108N that meet the governance policies 109E. This limits the impact of bringing in new version(s) without any control and what versions can be used/viewed.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments 102 that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

identify a current version of an external component that is used in a first software application;

identify a new version of the current version of the external component;

in response to identifying the new version of the current version of the external component, implement the following actions:

identify changes to Application Programming Interfaces (APIs) in the new version of the current version of the external component by comparing APIs in the new version to APIs in the current version of the external component to provide a first impact score;

identify new vulnerabilities in the new version of the current version of the external component by comparing vulnerabilities in the new version against vulnerabilities in the current version of the external component to provide a second impact score; and determine a quality history associated with the new version of the current version of the external component to provide a third impact score, the quality history comprising, over a selected time period, one or more of a number of code changes, bug fixes, performance changes, and vulnerabilities;

generate, for display in a user interface, a composite score based on results of the actions, the composite score being based on the first, second, and third impact scores; and incorporating, based on the composite score, a selected version from the current version of the new version of the external component into a subsequent build of the first software application.

2. The system of claim 1, wherein identifying changes to the APIs in the new version of the current version of the external component comprises: comparing use of one or more objects returned by the APIs in the new version of the current version of the external component to use of one or more objects returned by the APIs in the current version of the external component, wherein the use of the one or more objects returned by the APIs includes where the one or more objects are: modified by an internal component in the first software application, passed between internal components in the first software application, and/or used in an interface in the first software application that sends the one or more objects to a second application.

3. The system of claim 2, wherein the first impact score varies based how the one or more objects are used by the APIs in the new version.

4. The system of claim 1, wherein identifying changes to the APIs in the new version of the current version of the external component comprises identifying, relative to the current version, that the APIs: have been modified, have been removed, have been added to, and/or have been overloaded and wherein the first impact score is generated based on identifying that the APIs have been modified, have been removed, have been added to, and/or have been overloaded.

5. The system of claim 1, wherein the actions further comprise at least one of: identifying an open-source license, evaluating engineering resources, identifying typo squatting vulnerabilities, identifying a quality of a code repository, identifying a code flaw, identifying performance changes, and identifying changes to internal components, wherein the new vulnerabilities comprise one or more of a potential dependency confusion related vulnerability, an attack vector vulnerability, and a cross component vulnerability, and wherein the identified new vulnerabilities are ranked based on selected heuristics comprising severity and/or type.

6. The system of claim 1, wherein the new version of the current version of the external component comprises a plurality of new versions and wherein generating the composite score comprises displaying individual composite scores for the plurality of new versions for the external component.

7. The system of claim 6, wherein the plurality of new versions further comprises a previous version of the external component.

8. The system of claim 1, wherein the computer readable and executable instructions further cause the microprocessor to:

receive input, from a user interface, which does at least one of the following:

remove one or more of the actions; and change a weight of the one or more the actions.

9. The system of claim 1, wherein the new version of the current version of the external component comprises a plurality of external components that, when being added to the first software application, cause a cross-component vulnerability and wherein the composite score is generated based on the cross-component vulnerability.

10. The system of claim 1, wherein the new version of the current version of the external component comprises a plurality of new versions and wherein the composite score is a total composite score that is dynamically generated when input is received from the user interface to select individual ones of the plurality of new versions.

11. The system of claim 1, wherein the new version of the current version of the external component is filtered before being viewed in a development environment and/or a project by a party different than a developer.

12. The system of claim 1, wherein the computer readable and executable instructions further cause the microprocessor to: receive input, from a user interface that identifies governance policies applicable to a project.

13. A method comprising:

identifying, by a microprocessor, a current version of an external component that is used in a first software application;

identifying, by the microprocessor, a new version of the current version of the external component;

in response to identifying the new version of the current version of the external component, implementing, by the microprocessor, the following actions:

identify changes to Application Programming Interfaces (APIs) in the new version of the current version of the external component by comparing APIs in the new version to APIs in the current version of the external component to provide a first impact score;

identify new vulnerabilities in the new version of the current version of the external component by comparing vulnerabilities in the new version against vulnerabilities in the current version of the external component to provide a second impact score; and determining, by the microprocessor, a quality history associated with the new version of the current version of the external component to provide a third impact score, the quality history comprising, over a selected time period, one or more of a number of code changes, bug fixes, performance changes, and vulnerabilities;

generating, for display in a user interface, a composite score based on results of the actions, the composite score being based on the first, second, and third impact scores;

in response to the generated user interface display comprising the composite score receiving a selected version from the current version or the new version of the external component; and incorporating the selected version into a subsequent build of the first software application.

14. The method of claim 13, wherein identifying changes to the APIs in the new version of the current version of the external component comprises:

comparing use of one or more objects returned by the APIs the new version of the current version of the external component to use of one or more objects returned by the APIs in the current version of the external component, wherein the use of the one or more objects returned by the APIs includes where the one or more objects are: modified by an internal component in the first software application, passed between internal components in the first software application, and/or used in an interface in the first software application that sends the one or more objects to a second application.

15. The method of claim 13 wherein identifying changes to the APIs in the new version of the current version of the external component comprises identifying, relative to the current version, that the APIs: have been modified, have been removed, have been added to, and/or have been overloaded and wherein the first impact score is generated based on identifying that the APIs have been modified, have been removed, have been added to, and/or have been overloaded.

16. The method of claim 13, wherein the actions further comprise at least one of: identifying an open-source license, evaluating engineering resources, identifying typo squatting vulnerabilities, identifying a quality of a code repository, identifying a code flaw, identifying performance changes, and identifying changes to internal components, wherein the new vulnerabilities comprise one or more of a potential dependency confusion related vulnerability, an attack vector vulnerability, and a cross component vulnerability, and wherein the identified new vulnerabilities are ranked based on selected heuristics comprising severity and/or type.

17. The method of claim 13, wherein the new version of the current version of the external component comprises a plurality of new versions and wherein generating the composite score comprises displaying individual composite scores for the plurality of new versions for the external component.

18. The method of claim 13, wherein the new version of the current version of the external component comprises a plurality of external components that, when being added to the first software application, cause a cross-component vulnerability and wherein the composite score is generated based on the cross-component vulnerability.

19. The method of claim 13, wherein the composite score comprises at least one of an estimated number of hours, a security analysis, a cost analysis, and an unexpected code change factor and wherein the new version of the current version of the external component comprises a plurality of new versions and wherein the composite score further comprises individual scores for each of the plurality of new versions of the current version of the external component.

20. The method of claim 13, wherein the new version of the current version of the external component comprises a plurality of new versions and wherein the composite score is a total composite score that is dynamically generated when input is received from the user interface to select individual ones of the plurality of new versions.

21. A non-transitory computer readable medium having stored thereon instructions that cause a processor to execute a method, the method comprising instructions to:

identify a current version of an external component that is used in a first software application;

identify a new version of the current version of the external component;

in response to identifying the new version of the current version of the external component, implement the following actions:

identify changes to Application Programming Interfaces (APIs) in the new version of the current version of the external component by comparing APIs in the new version to APIs in the current version of the external component to provide a first impact score;

identify new vulnerabilities in the new version of the current version of the external component by comparing vulnerabilities in the new version against vulnerabilities in the current version of the external component to provide a second impact score; and determine a quality history associated with the new version of the current version of the external component to provide a third impact score, the quality history comprising, over a selected time period, one or more of a number of code changes, bug fixes, performance changes, and vulnerabilities;

generate, for display in a user interface, a composite score based on results of the actions, the composite score being based on the first, second, and third impact scores; and incorporate, in response to the generated user interface display comprising the composite score, a selected version from the current version or the new version of the external component into a subsequent build of the first software application.

* * * * *